Dec. 27, 1955   O. J. POUPITCH   2,728,092
NUT FEEDING MEANS FOR A NUT AND WASHER ASSEMBLY MACHINE
Filed Oct. 20, 1951   6 Sheets-Sheet 1
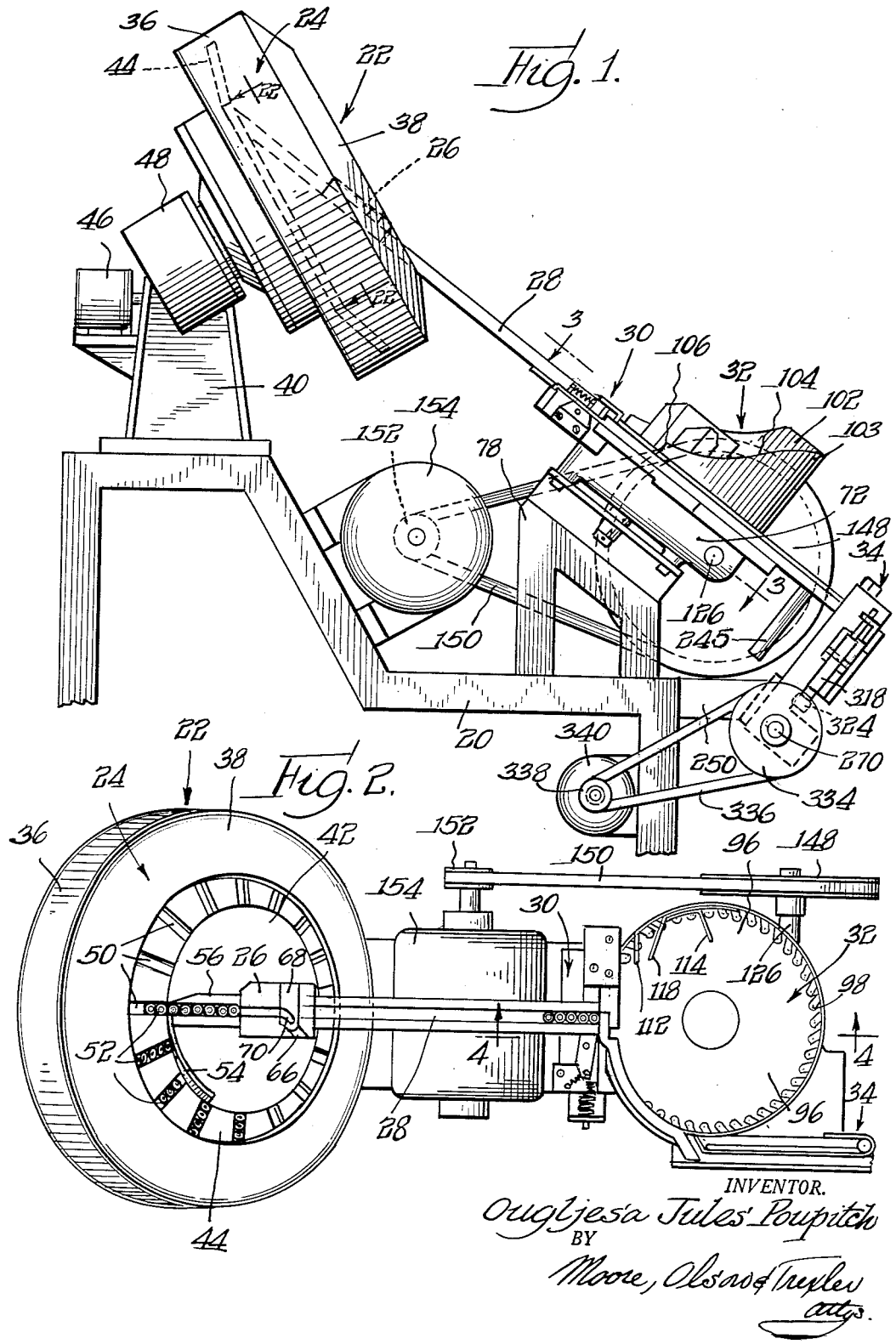
INVENTOR.
Ougljesa Jules Poupitch
BY
Moore, Olson & Trexler
attys.

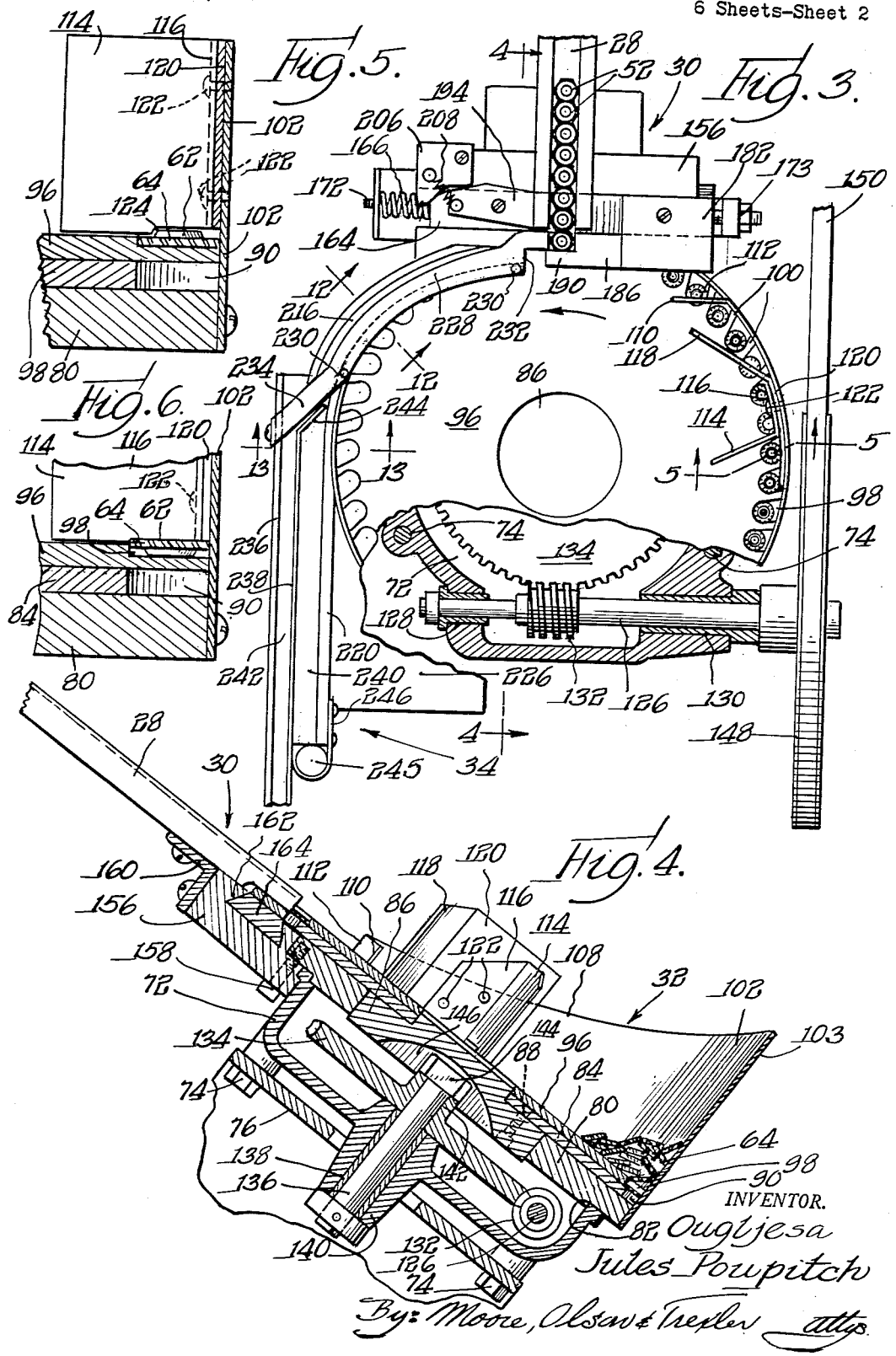

Dec. 27, 1955  O. J. POUPITCH  2,728,092
NUT FEEDING MEANS FOR A NUT AND WASHER ASSEMBLY MACHINE
Filed Oct. 20, 1951  6 Sheets-Sheet 3
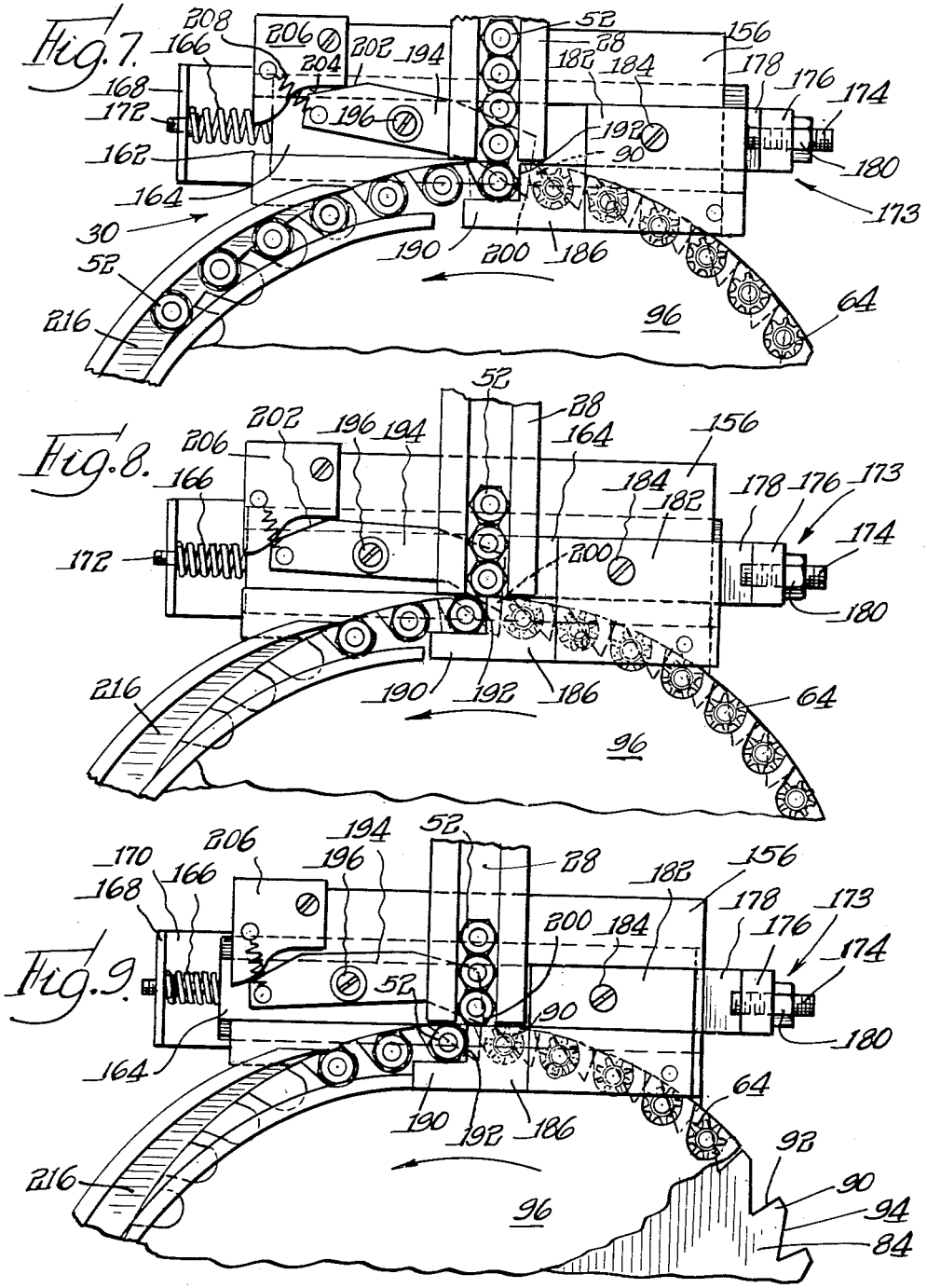
INVENTOR.
Ougljesa Jules Poupitch
BY
Moore, Olson & Trexler
Attys.

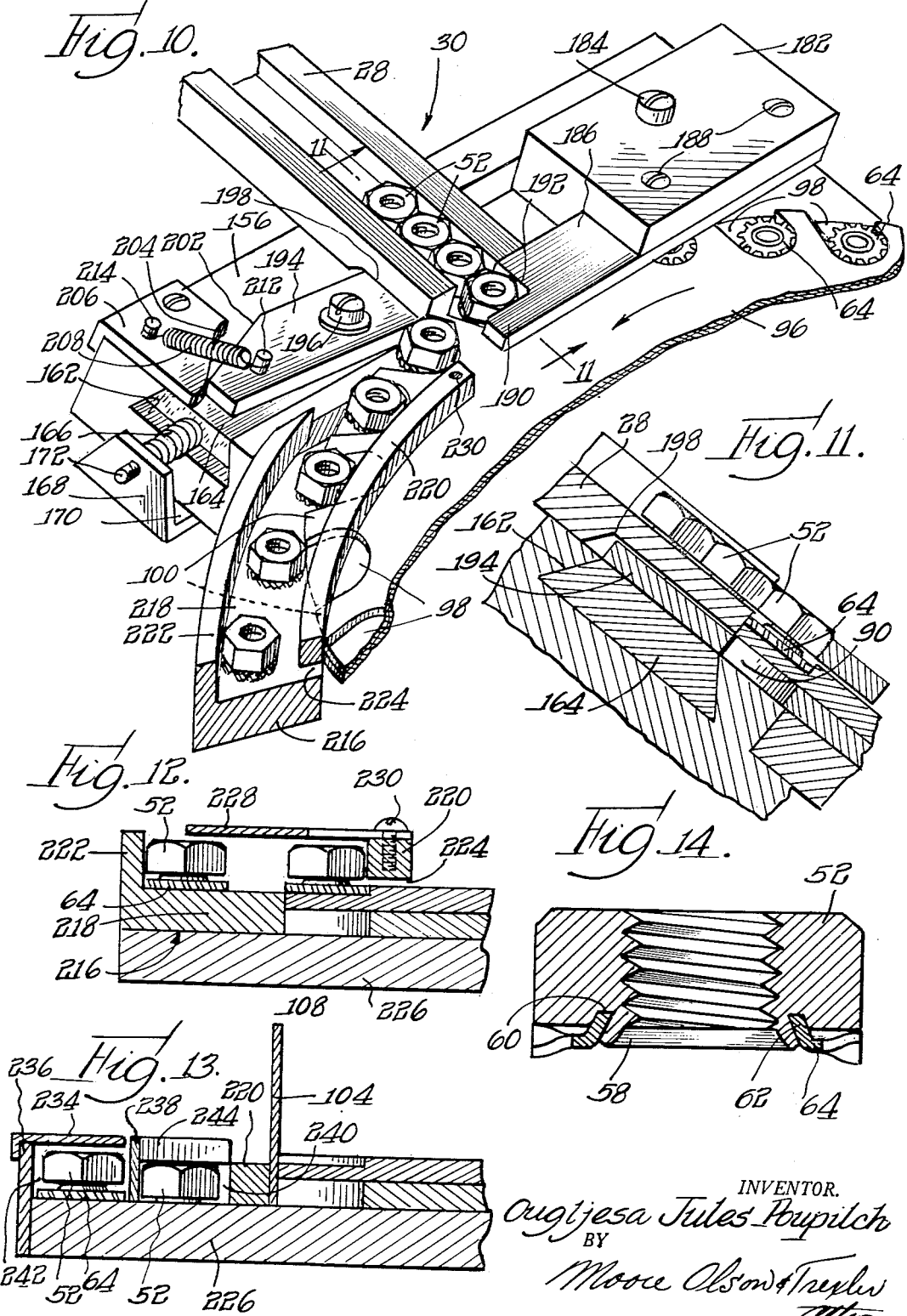

Dec. 27, 1955    O. J. POUPITCH    2,728,092
NUT FEEDING MEANS FOR A NUT AND WASHER ASSEMBLY MACHINE
Filed Oct. 20, 1951    6 Sheets-Sheet 5
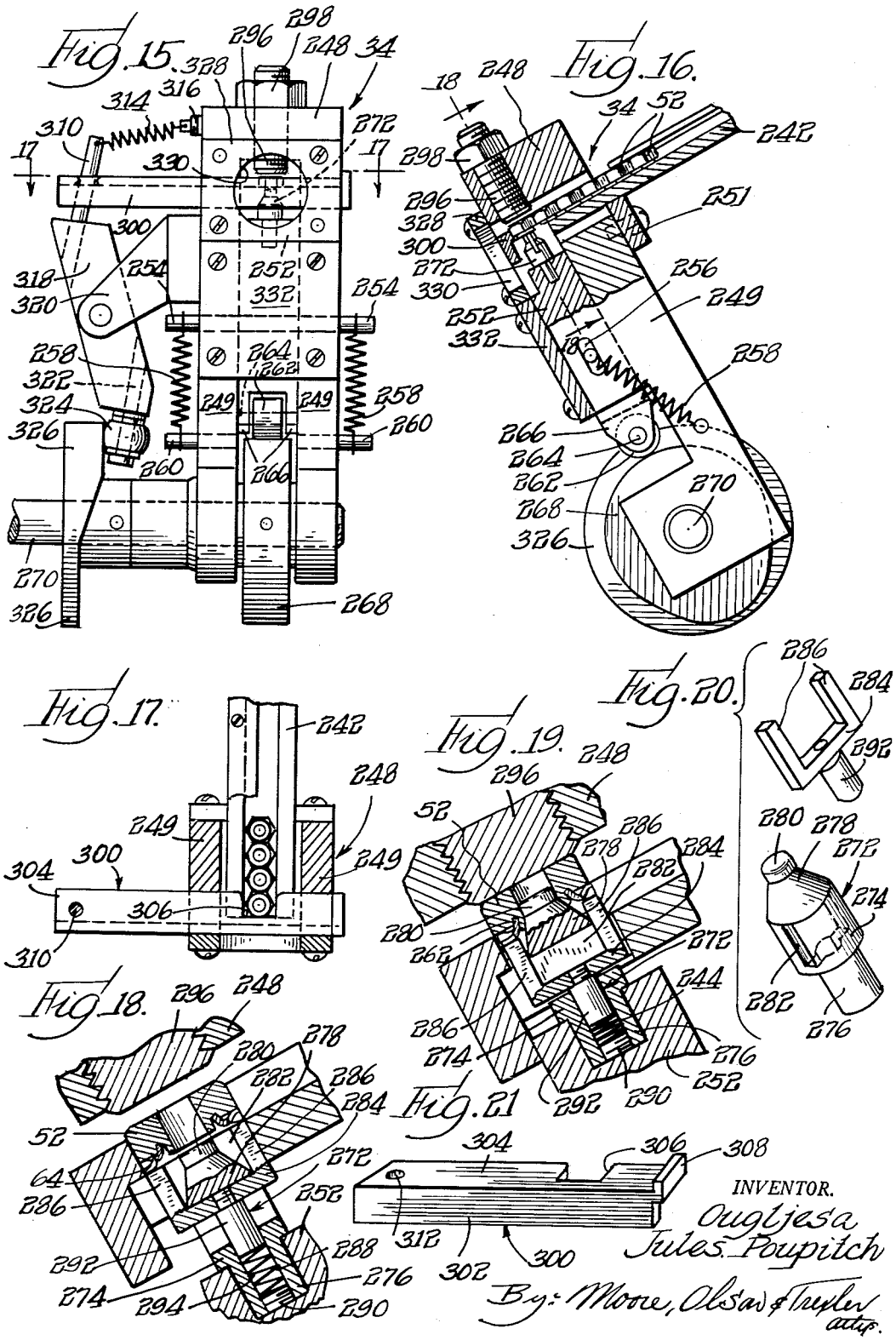
INVENTOR.
Ougljesa Jules Poupitch
By: Moore, Olson & Trexler
attys.

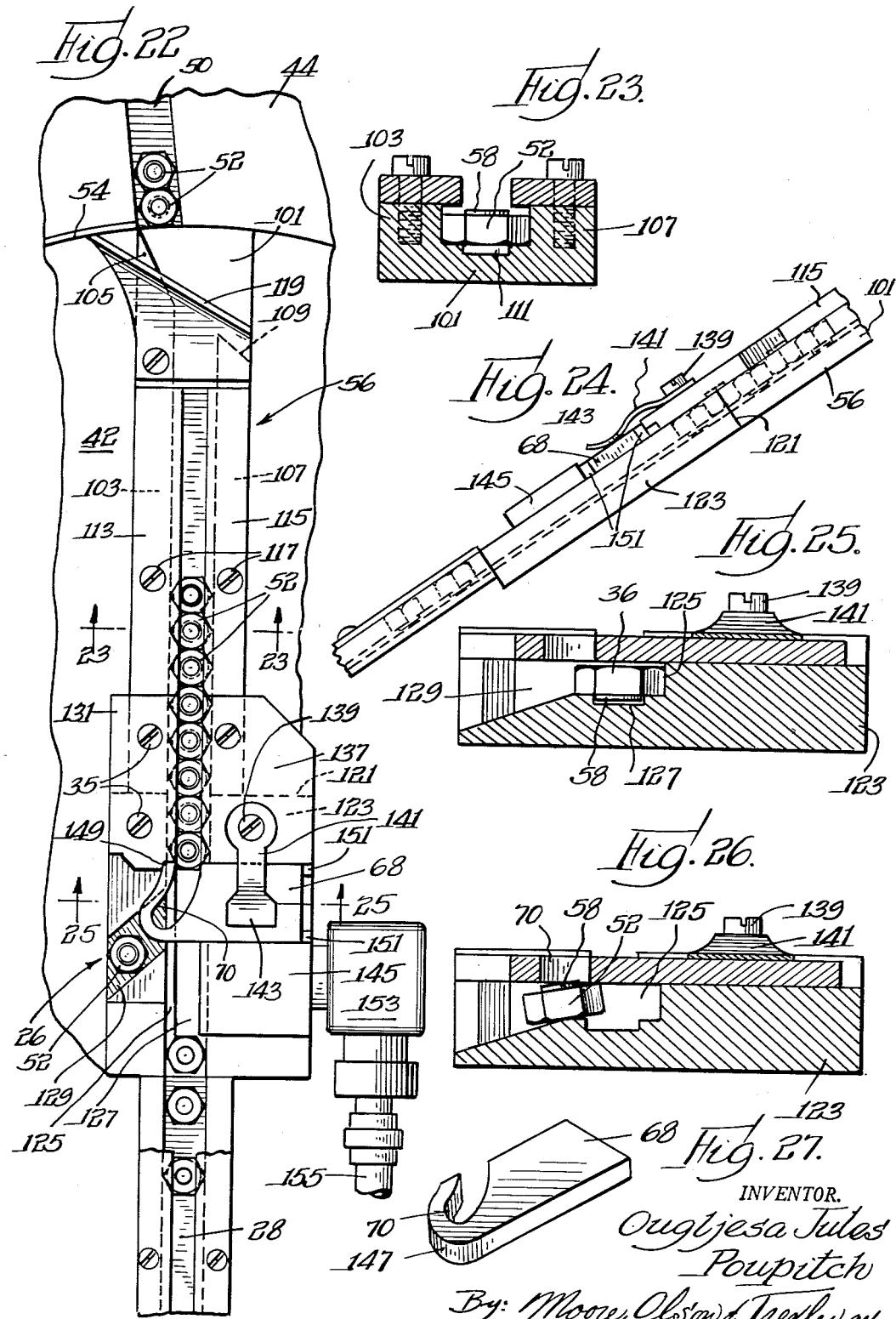

United States Patent Office 2,728,092
Patented Dec. 27, 1955

2,728,092

NUT FEEDING MEANS FOR A NUT AND WASHER ASSEMBLY MACHINE

Ougljesa Jules Poupitch, Chicago, Ill., assignor to Illinois Tool Works, Chicago, Ill., a corporation of Illinois Application October 20, 1951, Serial No. 252,292

20 Claims. (Cl. 10—155)

This invention is concerned with the assembling of washers and rotary fasteners and particularly with a machine for assembling lock washers and nut elements.

In order to attain a high rate of production of pre-assembled lock washers and nut elements it is desirable to utilize a washer and nut element carrier operating at a continuous uniform rate. At high carrier operating speeds it is difficult to position a nut element properly in the carrier in alignment with a washer. It is proposed herein to insure proper positioning of a nut element in a carrier in alignment with a washer by the provision of a combination gate and starter mechanism operating to release nut elements one by one to the carrier and concurrently to bring the nut elements up to the speed of the carrier.

An object of this invention is to provide an improved washer and nut element assembly machine having a starter mechanism for positioning nut elements on a carrier.

A more specific object is to provide, in a machine for assembling washers and nut elements, a washer and nut element carrier operating at a continuous uniform rate and a combination gate and starter mechanism for properly positioning nut elements on the carrier.

A further object of this invention is to provide, in a machine for assembling flanged lock washers and nut elements, an improved washer selector including a thin, rotary plate having shallow washer receiving recesses, and a fixed deflector for removing improperly oriented washers from said recesses.

Yet another object of this invention is to provide, in a machine for assembling washers and nut elements, a rotary disc carrier having washer receiving recesses defined by forwardly extending, relatively hook-like fingers facilitating picking up of washers by the recesses.

A still further object of this invention is to provide, in a machine for assembling washers and nut elements, a separator mechanism for directing aligned nut elements and washers to a telescoping mechanism and for directing individual nut elements to another station.

Other and further objects and advantages of the present invention will be apparent from the following description when taken in connection with the accompanying drawings:

Fig. 1 is a side view of an assembly machine embodying the principles of my invention;

Fig. 2 is a top view of the machine;

Fig. 3 is a top view of the washer hopper on an enlarged scale;

Fig. 4 is a sectional view taken along the line 4—4 of Fig. 2;

Fig. 5 is a sectional view taken along the line 5—5 of Fig. 3;

Fig. 6 is a view similar to Fig. 5 with a washer in inverted position;

Figs. 7–9 are fragmentary top views showing the combination gate and starter mechanism in different positions of operation;

Fig. 10 is a perspective view of the mechanism shown in Figs. 7–9;

Fig. 11 is a sectional view along the line 11—11 of Fig. 10;

Fig. 12 is a sectional view along the line 12—12 of Fig. 3;

Fig. 13 is a sectional view along the line 13—13 of Fig. 3;

Fig. 14 is a sectional view taken along the axis of an assembled lock washer and nut element;

Fig. 15 is an elevational view of the staking mechanism for permanently assembling the nuts and washers;

Fig. 16 is a side view of the staking mechanism, certain parts being sectioned;

Fig. 17 is a sectional view substantially along the line 17—17 of Fig. 15;

Fig. 18 is a sectional view substantially along the line 18—18 of Fig. 16;

Fig. 19 is a view similar to Fig. 18 and showing the parts in a different position;

Fig. 20 is an exploded perspective view of the washer lifting and nut swaging portions of the staking mechanism;

Fig. 21 is a perspective view of the slide for ejecting assembled nuts and washers;

Fig. 22 is an enlarged detail view of the nut element selector mechanism taken substantially along the line 22—22 of Fig. 1;

Fig. 23 is a cross-sectional view taken along the line 23—23 of Fig. 22;

Fig. 24 is a view of the nut element selector mechanism taken from the right of Fig. 22;

Fig. 25 is a cross-sectional view taken along the line 25—25 of Fig. 22 showing a nut element with the flange downwardly directed;

Fig. 26 is a view similar to Fig. 25 with the nut element flange upwardly directed; and Fig. 27 is a perspective view of the slotted plate of the nut element selector for returning nut elements having their flanges upwardly directed to the hopper.

Reference first should be made to Figs. 1 and 2 for a general understanding of a machine embodying the principles of my invention. The assembly machine comprises a base or table 20 on which is mounted nut supply mechanism 22 including a hopper 24, a nut selector 26, and a nut supply chute 28. The nut supply chute 28 leads to a combination gate and starter mechanism 30 positioned against the upper edge of a washer hopper 32. Aligned nut element and washer units pass from the hopper 32 to an assembly mechanism 34 where they are brought into permanently assembled telescopic association.

The nut supply mechanism

The nut hopper 24 is of a type well known in the art and includes a stationary central portion 42 surrounded by a rotatable ring 44. The ring 44 is driven by an electric motor 46 acting through suitable drive mechanism 48. The ring 44 is provided on its upper surface with a plurality of radially disposed grooves 50. Nut elements 52 dropped in the hopper casing 36 collect in the grooves 44 as the grooves pass through the lower portion of the casing upon rotation of the ring 44. As the ring 44 continues to rotate, the nuts in the rising grooves 50 are held in place by an arcuate plate or flange 54 upstanding from the fixed central portion 42 and positioned along the inner rim of the ring 44. As each groove 50 reaches its uppermost position it passes beyond the end of the flange 54, and the nuts 52 slide into a track 56 leading to the nut selector 26.

The nut elements 52 as best may be seen in Fig. 14 are of the type having dissimilar faces. Specifically, the nut element illustrated is provided with a flange 58 generally axially extending about the central bore of the nut element. Prior to assembly with a washer, the flange 58 extends parallel to the axis of the nut element. A circular groove 60 surrounds the flange 58 for receipt of a conical flange 62 of a toothed lock washer. As is shown in Fig. 14 the nut element flange 58 is swaged outwardly beneath the washer flange 60 to trap the washer in permanently assembled relation with the nut element. Nut elements having dissimilar faces and washer elements having projections from the body thereof are known colloquially in the trade as "one-way" nut elements and "one-way" washers respectively. For the sake of clarity and consistency of terminology the nut elements will be referred to generically hereinafter as asymmetric nut elements and the washers will be referred to as flanged washers, it being understood that nut elements and washers other than those specifically illustrated herein fall within the contemplation of this invention.

The nut elements 52 are delivered to the track 56 from the grooves 50 with either face up. Those having the flanges 58 upwardly directed are deflected to one side into a branch track 66 by a plate 68 having a deflecting groove 70 adapted to engage the nut element flanges for deflecting nut elements having upwardly directed flanges into the side track 66 from whence they drop back into the hopper 22. Nut elements having their flanges downwardly directed pass on into the track 28 and descend through the track under the influence of gravity. The track 28 is of the usual nut feeding type having a central nut accommodating slide with guide rails along either longitudinal edge.

Reference should be had to Figs. 22–27 for further details on the nut element selector. The recesses 50 of the ring 44 pick up nut elements 52 as the ring rotates to pass the recesses or grooves 50 successively beneath a random mass of nut elements lying in the lower portion of the casing 36 of the hopper 24. Continued rotation of the ring 44 raises the nut elements toward the upper portion of the hopper, the nuts being held in the grooves by the arcuate plate or flange 54 fixed on the stationary central portion 42 along the inner edge of the ring 44.

The stub track 56 receiving the nut elements from the ring 44 includes a bottom plate 101 substantially contacting the inner edge of the ring 44 and on a level with the bottoms of the grooves or recesses 36 at the inner ends thereof. A first guide rail 103 is secured along one longitudinal edge of the plate 101 and extends to the upper edge of the plate 101, the guide rail 103 having its inner edge relieved at the upper end 105 to centralize nut elements 52 on the plate 101. A second longitudinal guide rail 107 lies along the opposite edge of the plate 101 and is spaced from the guide rail 103 just slightly greater than the maximum diameter of one of the nut elements 52. The upper end of the guide rail 107 is beveled at 109 to facilitate passage of nut elements from the plate 101 when the space between the rails 103, 107 is completely filled. The plate 101 and rails 103 and 107 preferably are formed integral as shown in Fig. 23. The plate 101 is provided with a longitudinal recess 111 to accommodate the flanges, stub shafts, or other protuberances 58 of nut elements 52 having the flanges downwardly directed. The flange has been exaggerated slightly in axial extent for illustrative purposes and extends parallel to the axis of the nut before being staked or swaged for permanent assembly of the nut with a lock washer.

Longitudinal retainer strips 113 and 115 are secured along the upper edges of the guide rails 103 and 107 by suitable means such as screws 117 and partially overlie the space between the rails to retain the nut elements in proper position in the chute or track 56. An upwardly curved deflecting plate 119 is secured to the upper end of the chute or track 56 for insuring proper seating of nut elements beneath the retainer strips 113 and 115. The curved plate 119 has its upper portion angled somewhat similarly to the relieved or beveled rail edges 105 and 109 to deflect nut elements back into the hopper should the nut elements tend to pile up on top of one another as they pass from the recesses or grooves 50.

The chute or track 56 is terminated at its lower end at 121 and a relatively wide block 123 is suitably fixed to the lower end of the chute and is longitudinally recessed at 125 to provide a continuation of the washer chute 56. A second recess 127 of lesser extent extends longitudinally of the recess 125 in the lower face thereof to provide clearance for the nut element flanges of nut elements having their flanges directed downwardly. The block is provided with a further recess or groove forming a side track 129 branching from the longitudinal groove 125.

A plate 131 is secured by means such as screws 135 to the top of the block 123 and to the top of the guide rail 103 and forms a continuation of the retaining strip 113. Similarly a plate 137 is secured to the top of the block 123 and to the top of the guide rail 107 by means such as screws 139. The lowermost screw 139 additionally secures a leaf spring 141 having a broad tongue portion 143 bearing upon and holding down the plate 68 fitting on top of the block 123 and between the plate 137 and a plate 145.

The plate 68 as particularly may be seen in the perspective view of Fig. 27 has a rounded outer end portion 147. The recess 70 curves into this end portion and leads directly into the side track 129 as best may be seen in Fig. 22.

Nut elements 52 passing down the stub track or chute 56 with their flanges 58 downwardly directed pass into the block 123 with the nut element flanges fitting in the narrow recess 127 as shown in Fig. 25 and pass under the plate 68 to continue down the groove or track 127 to the combination gate and starter mechanism as will be set forth hereinafter.

Nut elements which have their flanges upwardly directed have their flanges 58 engaged by the slot 70 of the plate 68 and are deflected into the side track 129 as shown in Fig. 26. Endwise motion of the plate 68 (transversely of the chute 56 and block 123) is prevented by interfitting of the plate 68 with the plate 131 at 149 and by flange means 151 either on the block 123 or on the plates 137 and 145, and extending past the transverse end of the plate 68. The spring mounting of the plate 68 facilitates ready insertion and removal of the plate and provides a quick and easy means for clearing any possible jam such, for instance, as might be caused by defective nut elements.

Nut elements 52 passing into the side track 129 drop off the edge of the block 123 back into the random mass in the hopper.

To insure proper jam free feeding of nut elements through the selector 26 and the chute 28, an air vibrator 153 is secured to the side of the selector. The air vibrator is of conventional construction and is supplied with air under pressure through a pneumatic line or hose 155.

The washer hopper

The washer hopper 32 comprises a cup-like casting or gear housing 72 (Figs. 1, 3, and 4) secured as by bolts 74 to a table 76 forming the top part of a mounting bracket 78 on the table or support 20. A ring 80 is provided with a shoulder portion 82 interfitting with the top of the gear housing 72 and is secured to the gear housing in any suitable manner. An actuator plate consisting of a flat ring 84 is rotatably mounted on top of the ring 80 and is fixed to a central hub 86 by any suitable means such as bolts or screws 88. The actuator plate 84 is provided with peripheral teeth 90 (see also Fig. 9). The teeth 90 are provided with blunt leading edges 92 which are substantially radially arranged for engaging a portion of the combination gate and starter mechanism 30 for driving the same as will be apparent hereinafter. The trailing edges 94 of the teeth are arranged at a fairly shallow angle to tangents to the actuator plate 84 at the tips of the teeth.

A thin washer feed plate or disc 96 in the form of a ring is secured to the top of the actuator plate 84 in any suitable manner. The washer feed plate 96 is provided with shallow recesses 98 spaced about its periphery. The recesses 98 are substantially U-shaped and are defined by fingers 100 extending forwardly in the direction of rotation.

A retainer wall 102 extends around a considerable portion of the periphery of the washer feed plate or disc 96 and is secured to the ring 80 by any suitable means. The retainer wall 102 is highest at 103 adjacent the lower edge of the washer feed plate 96 and is cut down at 104 in a smooth curve and is terminated abruptly at 106 to form a leading edge (the edge toward which the disc or plate 96 turns). The retainer wall 102 also is cut down at 108 in a smooth curve and is terminated abruptly to form a trailing edge 110. A section 112 of the retainer wall 102 adjacent the trailing edge 110 is bent inwardly across the top of the washer feed plate or disc 96.

A washer stripper or deflector 114 extends inwardly from the retainer wall 102 and is provided with an arcuate attaching section 116. A secondary washer stripper or deflector 118 also extends inwardly from the wall 102 and is provided with an arcuate attaching section 120. The section 120 fits against the wall 102 and the section 116 fits against the section 120, the two sections and wall being held together by any suitable means such as nuts and bolts or rivets 122. As best may be seen in Figs. 5 and 6 the washer stripper or deflector 114 (and also the deflector 118) is provided at its inner edge with an undercut 124 providing clearance space for washers 64 in the recesses 98 oriented with their flanges 62 up. The undercuts 124 do not provide clearance for washers 62 which are oriented in the recesses 98 with their flanges 64 down. Washers 62 oriented with their flanges down, and other improperly seated washers, such as washers only partially in a recess, and washers stacked on top of one another are cleared from the recesses by one or the other of the washer strippers or deflectors 114 and 118. The inturned end section 112 of the retainer wall provides a final guard against improperly seated or stacked up washers being carried by the washer feed plate or disc 96 to its upper limits of travel.

A shaft 126 (Figs. 1–4) is journaled in suitable sleeve bearings 128 and 130 in the gear housing 72 and is provided with a worm 132. The worm is in driving engagement with a worm wheel 134 on a shaft 136 journaled in a sleeve bearing 138 in a boss 140 on the bottom of the gear housing 72. The worm wheel 134 is provided with an upwardly extending hub 142 having opposed flats 144 fitting in a slot 146 in the bottom of the hub 186 for driving the same. A pulley 148 is fixed on the outer end of the shaft 126 and is driven by a belt 150 passed over the pulley 148 and a pulley 152 on the output shaft of an electric motor 154. The separate drive motors for the washer hopper and for the nut hopper allow the speeds of the washer hopper and the nut hopper to be adjusted relatively to supply washers and nut elements in equal amounts for assembly as will be apparent.

*The combination gate and starter mechanism*

The combination gate and starter mechanism 30 as may be seen particularly in Figs. 7–11 is located at the lower end of the nut feeding chute 28 and includes a slide block 156 secured beneath the ring 80 and against the gear housing 72 by means such as screws or bolts 158 (Fig. 4). An angle bracket 160 secures the chute or track 28 to the slide block 156, and the lower end of the track extends over the slide block 156 into close proximity with the periphery of the washer feed plate or disc 96.

The upper portion of the slide block 156 is provided with a dovetailed slideway 162 in which a dovetailed slide 164 is reciprocably mounted. A coil spring 166 is compressed between one end of the slide 164 and the upturned flange 168 of a bracket 70 secured beneath the block 156. A pin or screw 172 is provided in the flange 168 for properly locating the spring. The spring 166 normally urges the slide oppositely of the direction of rotation of the washer feed plate or disc 96. A stop 173 for limiting the slide 164 is provided at the opposite end of the block 156 and comprises a screw 174 threaded through an upstanding flange 176 of a bracket 178 secured beneath the end of the block 156 in any suitable manner. A jam nut 180 is provided for locking the screw in any desirable adjusted position.

A mounting block 182 having a substantially L-shaped cross section is secured to the top of the slide 164 at the end adjacent the stop 173 by means such as a bolt or screw 184, suitable keying means being provided to prevent rotation of the block about the bolt or screw. A rectangular bar-like gate and starter finger 186 is secured beneath the block 182 by means such as screws 188 and is provided with an extending tip 190 of reduced width. The extending tip 190 form a shoulder 192 with the remainder of the finger 186 as best may be seen in Fig. 10. The length of the tip 190 and the width of the shoulder 192 are sufficient to accommodate nut elements 52 one by one.

A pawl 194 is pivoted on the top of the slide 164 at 196 and one end of the pawl fits in a cutout 198 (Fig. 11) on the under side of the lower end of the nut track or chute 28. The end of the pawl fitting beneath the track is angularly formed to provide a tooth or tip 200 (Figs. 7–9) cooperable with the teeth 90 of the actuator plate 84. The opposite end or tail of the pawl 194 is beveled at 202 for cooperation with the edge 204 of a cam 206 mounted on the rear corner of the block 164. A spring 208 stretched between a pin 212 (Fig. 10) on the tail of the pawl and a pin 214 on the cam normally pivots the pawl about its pivot 196 to maintain the tip 200 in engagement with one of the teeth 90. Engagement of this tip with a tooth acts to drive or shift the slide 164 and hence the finger 186 with the plates or discs 84 and 96 until the cam surface 204 engages the beveled tail 202 to withdraw the tip from the tooth at which time the spring 166 returns the slide and finger to their initial positions. Such movement positions nut elements 52 one by one on top of washers 64 in the recesses 98 of the washer feed plate or disc 96 as will be set forth in greater detail hereinafter.

*The assembly mechanism*

The assembly mechanism 34 comprises a guideway 216 having a floor or supporting plate 218 arranged with its upper end in close juxtaposition to the periphery of the washer disc 96 and with the upper surface of the supporting plate 218 at its upper end on a level with the bottoms of the recesses 98. The guideway 216 curves outwardly at a shallow angle from the periphery of the disc 96 and is provided with inner and outer guide rails 220 and 222 respectively, the inner guide rail 220 being slotted at 224 (Figs. 10 and 12) to extend inwardly past the inner edges of the recesses 98. The guideway 216 is downwardly inclined at an angle just slightly steeper than the inclination of the washer plate 96 so that aligned nut and washer elements deflected into the guideway 216 by the inner guide rail 220 as shown by Figs. 10 and 12 pass down the guideway under the influence of gravity and on to a plate 226 (Figs. 3, 12, and 13) forming a continuation of the washer hopper selector ring 80. An upper guide or cover 228 is secured to the inner rail 220 at 230 and maintains aligned nut elements and washers properly seated in the guideway. The upper or forward edge of the cover 228 is provided with a shoulder 232 interfitting with the extending tip 190 of the gate and starter finger 186 and the lower or trailing end extends outwardly over the upper corner of the plate 226 at 234.

The inner guide rail 220 extends straight down along the top surface of the plate 226 to the lower edge of the plate. A guide rail or strip 236 extends along the top surface of the plate 226 in parallelism with the rail 220 and is spaced therefrom a distance slightly greater than twice the maximum diameter of a nut element. The lower end 234 of the cover 228 overlies the guide rail or strip 236 as may be seen in Figs. 3 and 13 and is secured thereto in any suitable manner.

A center strip 238 divides the space between the rails 220 and 236 into a track 240 for nut elements without washers and a track 242 for aligned and superposed nut elements and washers. The strip 238 is provided with an upwardly and inwardly extending deflector tip 244 (Figs. 3 and 13) having a lower edge spaced above the plate 226 a sufficient distance to pass individual, separate nut elements 52 into the track 240. The lower edge of the deflector 244 is positioned close enough to the table 226 to engage nut elements aligned with and stacked on top of washers to deflect the aligned nut elements and washers into the nut element and washer track 242. Aligned nut elements and washers slide down the track 252 to the assembly mechanism 34 as shown in Figs. 1 and 15–21. Individual nut elements in the track 240 drop from the end of the track into a tube 245 (Figs. 1 and 3) secured to the guide rail 220 by a bracket 246. The bracket may be adapted for quick detachment of the tube 245 to remove the individual nut elements, or the tube may be extended to carry the nut elements to a storage container.

The assembly mechanism

The chute 242 carries aligned and superposed nut elements and washers to the assembly mechanism 34 shown generally in Fig. 1 and in detail in Figs. 15–21. The assembly mechanism comprises a frame 248 having a pair of side plates 249 suitably supported by a bracket 250 extending from the pedestal or frame 20. The lower end of the chute or track 242 extends between the side plates 249 and is supported by a cross bar 251 secured by any suitable means such as bolts or screws to the plates 249.

A slide 252 is slidably held in the frame 248 between the side plates 249 by any suitable means. Pins 254 extend transversely from the slide 252 through elongated apertures 256 and springs 258 are stretched between the pins 254 and pins 260 fixed on the frame 248 and spaced below the pins 254. A cam follower roller 262 is carried on a pin 264 between a pair of arms 266 at the bottom of the slide 252. The cam follower roller 262 is urged by the springs 258 against a cam 268 fixed on a cam shaft 270 journaled in suitable bearings near the lower ends of the side plates 249.

A nut swaging tool or staking pin 272 best seen in Figs. 18–20 is carried at the top of the slide 252 and comprises a cylindrical body 274 having a reduced neck portion 276 at the lower end thereof. A conical portion 278 leads upwardly from the cylindrical body 274 to a tip 280 having a rounded off upper end. The reduced neck portion 276 is received in an aperture in the top of the slide 252 and is fixed therein by any suitable means such as being sweated into place. The cylindrical body 274 is provided with a transverse slot or aperture 282 within which is housed a yoke 284 having parallel side arms 286. The reduced neck portion 276 is provided with an axial bore 288 closed by a plug 290 threaded into the lower end. The upper end of the bore 288 communicates with the transverse slot or aperture 282 at the lower end thereof. A cylindrical stub shaft 292 is housed within the bore 288 and has a reduced upper end threaded into the cross arm of the yoke 284. A coil spring 294 is compressed beneath the stub shaft 292 in the bore 288 and normally urges the yoke upwardly to the position shown in Fig. 18. An anvil 296 in the form of a threaded rod or bolt is adjustably positioned above the staking pin 272 and in axial alignment therewith. A jam nut 298 is threaded on the anvil and abuts the top of the frame 248 to lock the anvil in adjusted position.

A nut slide 300 (see particularly Fig. 21) is transversely disposed in the frame 248 in suitable slots in the side walls 249. The nut slide 300 comprises an angle member having a vertical wall 302 and a horizontal wall 304. A substantially rectangular opening or cutout 306 is provided in the horizontal wall 304 for receiving a nut element 52 and aligned washer element 64 from the chute 242 when the cutout 306 is aligned with the chute. The outer corners of the opening or cutout 306 are rounded or beveled to facilitate the entry of nuts. An upturned flange 308 on one end of the slide forms a stop limiting movement of the slide 300 in one direction.

A pin 310 is pivotally received in an aperture 312 in the horizontal wall of the nut slide 300 and a coil spring 314 is stretched between the upper end of the pin 310 and a screw 316 threaded into the upper end of the frame 248 on one side thereof. The tension on the spring 314 can be adjusted by threading the screw 316 in and out.

The lower end of the pin 310 is fixed in a lever arm 318 pivoted between a pair of arms 320 of a bracket secured on the side of the frame 248. The lower end of the lever 318 carries a pin 322 on which is rotatably journaled a cam follower roller 324. The cam follower 324 rides against the face of a cam 326 fixed on the cam shaft 270. A low portion of the cam allows the spring to shift the slide longitudinally of the slide to eject permanently assembled nut elements and washers to one side of the assembly mechanism 34. The advancement of the nut slide 300 under the influence of the spring 314 to eject a nut element and washer assembly prevents damage to the mechanism in case of a jam. The nut slide 300 will be seen to be held in place by a rectangular plate 328 suitably secured across the space between the side arms 249 near the upper end thereof. The plate 328 is provided with a circular aperture 330 for clearance for any jam that might develop. In addition to the pins 254 and slots 256, a plate 332 secures the slide 252 in position, the plate 332 being secured in any suitable manner to the side arms 249 directly below the plate 328.

A pulley 334 (Fig. 1) is fixed on the end of the cam shaft 270 and a belt 336 transmits power to this pulley from a pulley 338 on the shaft of an electric motor 340 carried by the main frame or pedestal 20 of the machine.

Operation

Rotation of the washer feed plate or disc 96 and of the actuator plate 84 through the drive connections set forth from the motor 154 causes washers dumped in the hopper 32 to settle in the recesses 98 of the disc 96 as the recesses pass beneath a random mass of washers 64 in the lowest portion of their path of travel. The washers are carried upwardly as the disc 96 continues to rotate. The forward inclination of the projections 100 defining the recesses 98 aids materially in picking up washers and feeding them upwardly. Those which are oriented with their flanges up and are properly seated in the recesses 98 pass beneath the washer stripper or deflectors 114 and 118 and the inturned end 112 of the retainer wall 102. Washers which are oriented with their flanges down, which are improperly seated, or which are stacked on top of one another are deflected by one of the deflectors or the inturned end to slide back down the plate into the random mass of washers at the bottom of the hopper.

Nut elements picked up by the grooves 50 of the hopper 24 upon rotation of the ring 44 through a mass of nut elements in the bottom of the hopper pass from the grooves into the stub track 56 as the grooves reach their uppermost position. The nut elements pass into the track 56 with either face up and those with the flange up are deflected into the side track 66 of the washer selector 26 and drop back into the random mass of nut elements in the bottom of the hopper. The nut elements that are oriented with their flanges down slide down the track 28 under the influence of gravity. The lowermost nut is stopped by the extending tip 190 of the gate and starter finger 186 as shown in Figs. 7 and 10, the finger 186 being in the precise position shown in these two figures only when a recess 98 is substantially aligned with the bottom end of the chute or track 28. The disc 96 and similarly the disc 84 rotate at a continuous uniform rate and the gate and starter finger 186 insures proper settling of a nut element 52 on top of a washer 64 in each groove 98.

As shown in Fig. 7 the tip 200 of the pawl 194 engages the substantially radially disposed leading edge 92 of one of the teeth 90. This causes the slide 164 and consequently the finger 186 to be reciprocated in the direction of motion of the periphery of the disc as shown in Fig. 8, the shoulder portion 192 of the finger positioning the nut element 52 before it at the same rate as a washer 64 aligned therewith in a groove 98. Movement of the slide 164 to the left moves the beveled tail 202 of the pawl 194 along the cam surface 204 of the cam 206 partially to retract the pawl tip 200 from engagement with the tooth 90 as shown in Fig. 8. Inherent vibration of the machine insures settling of the nut element 52 in proper aligned position on top of the washer 64 by the time the slide 164 and finger 186 reached their left-most position of travel as shown in Fig. 9. At this time the cam 206 has pivoted the pawl 194 a sufficient distance completely to retract the tip 200 from the tooth 90. The spring 166 then returns the slide 164, finger 186, and pawl 194 rapidly to their initial position as determined by the screw 174 of the stop 173. This allows a next nut element 52 to slide from the track into position against the finger tip 190 and shoulder 192. The pawl tip 200 then is engaged by the succeeding tooth 90 of the actuator plate 84 as shown in Fig. 7 for a succeeding and similar operation.

Nut elements positioned on top of washers in the recesses 98, or actually in a recess should no washer be present in that recess, are engaged by the inner guide rail 220 of the guideway 216 and are deflected into the guideway as best may be seen in Figs. 10 and 12. The few nut elements not positioned on washers due to the occasional absence of a washer from a recess pass beneath the deflector 244 (Fig. 13) and on down the track 240 (Fig. 3) and into the tube 244 (Figs. 1 and 3). The deflector 244 engages nuts aligned with and on top of washers 64 due to the maintenance of such nut elements at a higher level by the underlying washers 64. The deflected, aligned nut elements and washers pass gravitationally down the track 242 to the assembly mechanism 34 for swaging of the nut element flange 58 to retain the washer and nut element in permanently assembled relation with the nut element and washer relatively rotatable.

When the slide 300 is in its fully retracted position, the slot or aperture 306 is aligned with the bottom of the chute 342 as shown in Fig. 17 and the staking pin 272 is in its lowermost position as shown in Fig. 18. The lowermost nut in the chute 342 slides under the influence of gravity into the slot 306 directly above the tip 280 of the staking pin 272. The bottom of the chute 242 is provided with a suitable aperture to allow passage of the staking pin and yoke arms 286 which move upwardly under the influence of the cam 268. The yoke arms 286 engage the washer 264 to lift the washer. The yoke arms lift the washer 64 and nut element 52 until the nut element engages the lower end of the anvil 296 as shown in Fig. 19. At this time the yoke 284 yields against the spring 294 and the rounded off tip 280 centralizes the nut element and passes upwardly through the bore of the nut element. The conical portion 278 of the staking pin 272 engages the nut skirt or flange 262 and swages it outwardly to trap the washer flange 62 as shown in Fig. 19. The limit of the upward movement of the staking pin relative to the anvil 296 is adjusted so that the nut element flange 58 does not clamp the washer flange 62 but merely traps the washer flange so that the nut element and washer of each assembly are free to rotate relative to one another.

The cam 268 then allows the springs 258 to retract the slide 252 following which the cam 326 allows the spring 314 to shift the slide 300 longitudinally of itself to eject the permanently assembled nut and washer assembly from one side of the assembly mechanism 34.

The assembly machine disclosed herein is capable of assembling washers and nut elements at a high rate of speed due to the continuous operation of the washer feeding disc or carrier at a constant uniform rate. The combination gate and starter mechanism insures proper alignment of nut elements and washers while the washer feeding disc or carrier is continually operating at such constant uniform rate.

Although a particular embodiment of this invention has been shown and described, it will be apparent that various changes in structure can be made without departing from the principles of the invention as expressed in the following claims.

I claim:

1. A nut element and washer feeding mechanism comprising means for feeding washers along a predetermined path at a predetermined rate, nut element feed means adjacent said path, and means for transferring nut elements one by one from said nut element feed means onto washers fed by said washer feeding means and in alignment with said washers fed thereby, said transferring means including means oscillatable substantially along the washer feed path for positively moving a nut element from said nut element feed means to said washer feeding means, and means for operating said nut element moving means in timed relation with the movement of said washer feeding means and including driven means connected to said transferring means and driving means on said washer feeding means operatively connected to the said driven means.

2. A nut element and washer feeding mechanism comprising means for feeding washers along a predetermined path at a predetermined rate, nut element feed means adjacent said path and substantially perpendicular thereto for feeding nut elements substantially at right angles to said washer feeding path, reciprocating means movable substantially along the washer feeding path for pushing nut elements from said nut element feed means substantially at right angles thereto on to washers fed by said washer feeding means, and means for operating said pusher means in timed relation with the movement of said washer feeding means and including a driven element on said pushing means and a plurality of driving elements on said washer feeding means successively engageable with the said driven element.

3. A nut element and washer feeding mechanism comprising means for feeding washers along a predetermined path at a predetermined continuous rate, nut element feed means adjacent said path, an oscillating nut element transfer member movable along a path between said nut element feed means and said washer feeding means, the path of said oscillating member at least in part overlying the path of said washers and being superimposed on said washer path, and means for oscillating said oscillating member in timed relation with the movement of said washer feeding means and including driving means on said washer feeding means and means connected to said transfer means and driven by said driving means.

4. A nut element and washer feeding mechanism comprising means for feeding washers along a predetermined path at a continuous rate, nut element feed means adjacent said path, a nut element transfer means reciprocable between said nut element feed means and said washer feeding means, the path of reciprocation of said nut element transfer means at least in part overlying the path of said washers and being aligned therewith, and means for reciprocating said nut transfer means in synchronism with the movement of said washer feeding means to position nut elements in alignment with washers fed by said washer feeding means while said washers are moving and including driving means on said washer feeding means and means connected to said transfer means and driven by said driving means.

5. A nut element and washer feeding mechanism comprising a washer feed disc having outwardly opening recesses for feeding washers along a predetermined path and said disc having driving means thereon, means for rotating said disc at a uniform constant rate, nut element feed means extending substantially radially inwardly relatively to said disc to a position adjacent the periphery of said disc, and means for transferring nut elements one by one from said nut element feed means onto washers in the recesses of said disc, said transferring means including means for positively moving a nut element from said nut element feed means to said washer feed disc, said nut element moving means being movable in the direction of rotation of said disc, and means for operating said nut element moving means in synchronism with said disc to transfer nut elements thereto while said disc is moving at said uniform constant rate and including means operatively connecting the nut element moving means to the driving means on the disc for shifting the nut element moving means in one direction and means for shifting the nut element moving means in a return direction to repeat the cycle of operation.

6. A nut element and washer feeding mechanism comprising a washer feed disc having outwardly opening recesses for feeding washers along a predetermined path and said disc having a succession of driving elements thereon, means for rotating said disc at a uniform constant rate, nut element feed means extending substantially radially inwardly relatively to said disc to a position adjacent the periphery of said disc and communicating with said recesses, and means for transferring nut elements one by one from said nut element feed means onto washers in the recesses of said disc, said transferring means including means reciprocable between said nut element feed means and said disc, the path of reciprocation of said reciprocable means in part overlying the periphery of said disc, and means reciprocating said reciprocable member in synchronism with said disc and including a driven element connected to said reciprocable transferring means and successively engaged by said driving elements.

7. A nut element and washer feeding mechanism comprising a tilted washer feed plate adapted to receive a random mass of washers on its surface, means for continuously rotating said washer feed plate at a predetermined rate, said washer feed plate having a serrated periphery defining a plurality of outwardly opening edge recesses for feeding washers from said random mass, the recesses being angularly disposed in the direction of rotation of said washer feed plate, nut element feed means adjacent the upper edge of said plate, means for transferring nut elements one by one from said nut element feed means onto washers in the recesses of said washer feed plate in nested relation with said washers, means for operating said transferring means in timed relation with the rotation of said plate, and means for transferring the nested nut elements and washers from said feed plate.

8. A nut element and washer feeding mechanism comprising a washer feed disc having a plurality of recesses for feeding washers and said disc having driving means thereon, means for rotating said disc at a predetermined rate in a given direction, a nut element feed chute terminated adjacent the periphery of said disc, a combination gate and starter mechanism movable substantially in said given direction for controlling the movement of nut elements from said feed chute and positively feeding them to the recesses of said disc, and means for operating said combination gate and starter mechanism in synchronism with said disc, and including means operatively interconnecting said driving means and said combination gate and starter mechanism for shifting the gate and starter mechanism in one direction and means for shifting the gate and starter mechanism in a return direction for repeating the cycle of operation.

9. A nut element and washer feeder mechanism comprising a washer feed disc having a plurality of outwardly opening edge recesses for feeding washers and said disc having a plurality of driving elements thereon, means for rotating said disc at a uniform constant rate in a given direction, a nut element feed chute terminated adjacent the periphery of said disc for feeding nut elements substantially edgewise toward said recesses, a combination gate and starter mechanism movable substantially in the same direction as the adjacent portion of said disc for controlling the movement of nut elements from said feed chute to the recesses of said disc, and means for operating said combination gate and starter mechanism in synchronism with said disc and including means operatively connecting the said combination gate and starter mechanism and said driving elements for successive engagement by said driving elements to move the gate and starter mechanism in one direction and means for moving the gate and starter mechanism in a return direction for repeating the cycle of operation.

10. A nut element and washer feeding mechanism comprising a washer feed disc having a plurality of outwardly opening edge recesses each adapted to receive a washer and said disc having a plurality of driving elements thereon, means for rotating said disc at a predetermined rate, a nut element feed chute extending outwardly of and disposed substantially radially of said disc and terminated adjacent the periphery of said disc, a reciprocable slide overlying the periphery of said disc and transversely disposed substantially across the termination of said nut element feed chute, and means connected to said slide and successively engaged by said driving elements for reciprocating said slide substantially tangentially of said disc and in timed relation with the rotation of said disc periodically to shift a nut element from said nut element feed chute onto a washer in a recess of said disc and means for shifting said slide in a return direction for repeating the cycle of operation.

11. A nut element and washer feeding mechanism as set forth in claim 10 wherein the slide is provided with a forwardly extending tip disposed radially inwardly of said disc relative to said recesses and spaced from the end of said nut element feed chute a sufficient distance to allow passage of a nut element from said feed chute to a position against said tip, all of said slide except said tip being retracted from the path of nut elements from said feed chute with said slide substantially at one limit of reciprocation.

12. A nut element and washer feeding mechanism comprising a washer feed disc having a plurality of recesses for carrying a succession of individual washers, means for rotating said disc at a predetermined rate in a given direction, a nut element feed chute having a discharge end adjacent said disc, a combination gate and starter mechanism including reciprocable slide means movable in the same direction as the adjacent part of the disc for controlling movement of nut elements one by one from said feed chute end positively feeding said nut elements onto washers in the recesses of said disc, a pawl for reciprocating such slide means, a plate having peripheral serrations cooperable with said pawl for periodically reciprocating said reciprocable slide at substantially the same rate as the periphery of said disc for positioning nut elements on washers carried in said recesses, and means for rotating said plate in unison with said disc.

13. A nut element and washer feeder mechanism comprising a washer feed disc having a plurality of recesses for carrying washers, means for rotating said disc to feed nut elements on to said washers in said recesses at a uniform constant rate in a given direction, a plate having a serrated periphery and fixed to said disc for rotation therewith, a nut element feed chute having a discharge end adjacent the periphery of said disc, and a combination gate and starter mechanism movable generally tangentially of said disc for controlling movement of nut elements from said feed chute on to washers in said recesses, said combination gate and starter mechanism including a reciprocable slide, a pawl on said slide engageable with the serrations of said plate for reciprocation of said slide in the same direction as the adjacent portion of said disc in timed relation with the movement of said washer feeding disc to feed nut elements on to said washers in said recesses, cam means for retracting said pawl from said serrations, and spring means for returning said slide to its original position upon retraction of said pawl and to release another nut element from said chute.

14. A nut element and washer feeder mechanism as set forth in claim 13 wherein the recesses are of substantially the same depth as the thickness of the washers to be fed.

15. A nut element and washer feeding mechanism comprising a washer feed disc having a serrated periphery, means for rotating said disc in a given direction at a uniform constant rate, the serrations defining a plurality of outwardly opening edge recesses inclined in the direction of rotation of said disc, means for positioning washers in said recesses, a nut element feed chute having a discharge end adjacent the periphery of said disc, a combination gate and starter mechanism for controlling movement of nut elements from said chute and the positive feeding thereof on to washers in said recesses, means mounting said combination gate and starter mechanism for reciprocation across the discharge end of said chute and above said recesses generally tangentially of said disc, actuating means for said combination gate and starter mechanism, and a toothed plate rotatable in unison with said washer feed disc, the teeth of said plate cooperating with said actuating means periodically to reciprocate said combination gate and starter mechanism.

16. Apparatus for assembling flanged lock washers and nut elements comprising means for feeding washers along a predetermined path at a predetermined rate with the washer flanges upwardly directed, nut element feed means adjacent said path, means for positively shifting nut elements one by one from said nut element feed means in the direction of motion of said washers along said washer feeding path into axial alignment with said flanged lock washers and positioned above said lock washers, means for operating said nut element feed means, said washer feeding means, and said nut element shifting means in timed relation, said operating means including a plurality of ratchet teeth on said washer feeding means and a pawl on said nut element shifting means successively engaged by said ratchet teeth for moving the shifting means in one direction and means for moving the shifting means in a return direction to repeat the cycle of operation and means for telescoping aligned washers and nut elements.

17. Apparatus for assembling nut elements and flanged lock washers comprising a washer feed plate adapted to receive a random mass of flanged lock washers on its upper surface, said feed plate having a plurality of marginal recesses receiving washers from the surface of the plate, means for rotating said washer feed plate at a uniform constant rate, deflector means overlying said plate adjacent the periphery thereof and passing washers properly seated in said recesses with their flanges upwardly directed while deflecting all other washers from said recesses, a nut feed chute having a discharge end adjacent the periphery of said plate, a combination gate and starter mechanism movable generally in the same direction as the adjacent portion of the feed plate for controlling movement of nut elements one by one from said feed chute on to washers in said recesses, means for operating said gate and starter mechanism in timed relation with the movement of said disc, and means for relatively telescoping said washers and the nut elements positioned on top of said washers.

18. Apparatus for assembling nut elements and flanged lock washers comprising a washer feed plate adapted to receive a random mass of flanged lock washers on its upper surface, said feed plate having a plurality of marginal recesses receiving washers from the surface of the plate, means for rotating said washer feed plate at a uniform constant rate, deflector means overlying said feed plate adjacent the periphery thereof and passing washers properly seated in said recesses with their flanges upwardly directed while deflecting all other washers from said recesses, a nut feed chute having a discharge end adjacent the periphery of said plate, means including a carrier movable past the discharge end of said chute in the direction of motion of the adjacent portion of said feed plate for positively feeding nut elements one by one from said chute into alignment with and on top of washers in said recesses, means for operating said positive feed means in timed relation with the movement of said washer feed plate, and means for telescoping aligned washers and nut elements.

19. Apparatus for assembling flanged lock washers and nut elements comprising a washer feed plate adapted to receive a random mass of washers on its upper surface and having a plurality of outwardly opening recesses receiving washers from the surface of the feed plate, means for rotating said feed plate at a uniform constant rate, deflector means overlying said plate adjacent the periphery thereof and adapted to pass properly seated washers having upwardly directed flanges while rejecting all other washers, a nut element feed chute, means including a carrier movable past the discharge end of said chute in the direction of motion of the adjacent portion of said feed plate for positively shifting nut elements one by one from said feed chute into aligned position on top of washers in said recesses, means for removing lock washers and nut elements from the recesses of said disc, means for telescoping aligned lock washers and nut elements, and means for segregating individual nut elements or washers from those which are aligned.

20. Apparatus for assembling flanged nut elements and flanged lock washer elements comprising means for conveying washer elements over a predetermined path with all of the flanges oriented in a given direction, a nut element feed chute, means for feeding flanged nut elements along said feed chute with all of the flanges oriented in a predetermined direction, a combination gate and starter mechanism movable substantially parallel to said washer element path for shifting nut elements one by one from said feed chute to said washer element feeding means with the washer element flanges and nut element flanges opposing one another in substantial alignment, the washer element flanges and nut element flanges substantially interfitting with one another, means for operating said washer conveying means and said combination gate and starter mechanism in timed relation, and means for deforming a flange of each pair of aligned elements permanently to retain the aligned elements together.

References Cited in the file of this patent

UNITED STATES PATENTS

| Number | Name | Date |
|---|---|---|
| 632,125 | Kershaw | Aug. 29, 1899 |
| 1,606,432 | Herkenhine | Nov. 9, 1926 |
| 1,861,889 | Stoll | June 7, 1932 |
| 1,946,820 | Stoll | Feb. 13, 1934 |
| 2,086,128 | Hackbarth | July 6, 1937 |
| 2,192,503 | Newman | Mar. 5, 1940 |
| 2,225,654 | Olson | Dec. 24, 1940 |
| 2,271,844 | Olson | Feb. 3, 1942 |
| 2,286,066 | Davis | June 9, 1942 |
| 2,288,620 | Goodhue | July 7, 1942 |
| 2,343,798 | Poupitch | Mar. 7, 1944 |